(12) United States Patent
Alao et al.

(10) Patent No.: US 8,712,245 B1
(45) Date of Patent: Apr. 29, 2014

(54) SYSTEM AND METHOD FOR INFRARED DONGLE

(71) Applicant: Tubetime Inc., Montreal (CA)

(72) Inventors: Rachad Alao, Montreal (CA); Michael Wayne Ambrose, Thousand Oaks, CA (US); Bertrand Boudaud, Paris (FR)

(73) Assignee: Tubetime Inc., Montreal, Quebec (CA)

( * ) Notice: Subject to any disclaimer, the term of this patent is extended or adjusted under 35 U.S.C. 154(b) by 0 days.

(21) Appl. No.: 13/728,886

(22) Filed: Dec. 27, 2012

(51) Int. Cl.
*H04B 10/00* (2013.01)
*H04B 10/02* (2011.01)

(52) U.S. Cl.
USPC .......................... 398/106; 398/118; 398/128

(58) Field of Classification Search
USPC .................. 398/106–114, 118–131; 455/420
See application file for complete search history.

(56) References Cited

U.S. PATENT DOCUMENTS

| | | | | |
|---|---|---|---|---|
| 5,598,569 | A * | 1/1997 | Catherwood et al. | 714/1 |
| 6,233,689 | B1 * | 5/2001 | Allen et al. | 713/320 |
| 6,234,983 | B1 * | 5/2001 | Storey et al. | 600/595 |
| 6,931,231 | B1 | 8/2005 | Griffin | 455/3.06 |
| 8,336,771 | B2 * | 12/2012 | Tsai et al. | 235/380 |
| 2002/0001381 | A1 * | 1/2002 | Mori | 379/387.01 |
| 2005/0249264 | A1 * | 11/2005 | Suzuki et al. | 375/130 |
| 2010/0323621 | A1 * | 12/2010 | Slamka et al. | 455/41.3 |
| 2011/0099311 | A1 * | 4/2011 | Kimura | 710/110 |
| 2011/0144778 | A1 * | 6/2011 | Fung et al. | 700/90 |
| 2011/0148604 | A1 * | 6/2011 | Miller | 340/12.22 |
| 2011/0153885 | A1 * | 6/2011 | Mak et al. | 710/106 |
| 2012/0050198 | A1 * | 3/2012 | Cannon | 345/173 |
| 2012/0171927 | A1 * | 7/2012 | Yu | 446/484 |
| 2012/0225645 | A1 * | 9/2012 | Sivan | 455/418 |

OTHER PUBLICATIONS

Thinkflood, "RedEye mini: take control on the road", Nov. 8, 2011, thinkflood.com/products/redeye-mini/ retreived from web.archive.org/web/20111108135209/http://thinkflood.com.products/redeye-mini/, pp. 1-7.*

Thinkflood, "RedEye mini: take control on the road", Nov. 8, 2011, thinkflood.com/products/redeye-mini/retreived from web.archive.org/web/20111108135209/http://thinkflood.com.products/redeye-mini/, pp. 1-7.*

Gewa. "PROGress Star / PROGress Micro USB Trainable Infrared Transmitters for PC." Spectronics: Inclusive Learning Technologies [online], [retrieved on Jan. 25, 2013]. Retrieved from the Internet <URL: http://www.spectronicsinoz.com/product/progress-star-progress-micro-usb-trainable-infrared-transmitters-for-pc> (assumed to be prior to Jan. 25, 2013).

Horwitz, Jeremy. "Apptwee Ri Universal Remote Control." iLounge: Reviews [online], Apr. 25, 2011 [retrieved on Jan. 25, 2013]. Retrieved from the Internet <URL: http://www.ilounge.com/index.php/reviews/entry/apptwee-ri-universal-remote-control/> (dated Apr. 25, 2011).

(Continued)

*Primary Examiner* — Daniel Dobson
(74) *Attorney, Agent, or Firm* — Nixon Peabody LLP

(57) ABSTRACT

A method of controlling consumer devices using an infrared dongle coupled to a mobile device includes receiving power for the infrared dongle from the mobile device. The infrared dongle includes an infrared transmitter coupled to a microcontroller. One or more instructions are received in the microcontroller from the mobile device. The received one or more instructions are generated from codes stored in a memory of the mobile device. In response to the receiving, one or more infrared signals are transmitted via the infrared transmitter to at least one of the consumer devices.

16 Claims, 11 Drawing Sheets

(56) References Cited

OTHER PUBLICATIONS

Murph, Darren. "i-Got-Control IRB1 dongle gives your iPhone / iPod touch universal remote functionality." Engadget [online], Mar. 18, 2010 [retrieved on Jan. 25, 2013]. Retrieved from the Internet <URL: http://www.engadget.com/2010/03/18/i-got-control-irb1-dongle-gives-your-iphone-ipod-touch-univers/> (dated Mar. 18, 2010).

"Guide: 3 steps blinQ Installation." blinQ, RyzMedia [online], [retrieved on Jan. 25, 2013]. Retrieved from the Internet <URL: http://www.blinqtv.com/guide> (assumed to be prior to Jan. 25, 2013).

"L5 Remote: FAQ." L5 Technology [online], [retrieved on Jan. 25, 2013]. Retrieved from the Internet <URL: http://www.l5remote.com/faq> (assumed to be prior to Jan. 25, 2013).

"RedEye mini: take control on the road." ThinkFlood, Inc. [online], [retrieved on Jan. 25, 2013]. Retrieved from the Internet <URL: http://thinkflood.com/products/redeye-mini/> (assumed to be prior to Jan. 25, 2013).

"Welcome to the USB-UIRT home page!" Electronic Systems Design [online], [retrieved on Jan. 25, 2013]. Retrieved from the Internet <URL: http://www.usbuirt.com> (assumed to be prior to Jan. 25, 2013).

\* cited by examiner

SYSTEM AND METHOD FOR INFRARED DONGLE

FIELD OF THE INVENTION

This invention is in the field of universal remote controllers, specifically concerning the use of mobile devices such as smartphones and tablets as universal remote controllers.

BACKGROUND OF THE INVENTION

With the increasing use of remote controllers to control consumer devices such as TVs, Blu-ray players, air-conditioners, stereos and DVD players, many consumers are increasingly finding it difficult to store all the different controllers for the different consumer devices in homes today.

With the increased adoption and penetration of mobile devices such as smartphones and tablets, these mobile devices offer the potential to be used as universal remote controllers. Furthermore, because these mobile devices can connect to manufacturers' websites, they can be used to download the IR codes used by manufacturers, and update these codes as necessary.

While some prior devices are capable of converting an audio signal output through a stereo headphone jack into an infrared (IR) remote control signal, these prior devices are limited in terms of the frequencies that can be used for transmission to below 40 kHz. Further, such prior devices are limited in the amount of power generated, which results in weak infrared signals being transmitted.

SUMMARY OF THE INVENTION

An infrared dongle for communicating with one or more consumer devices includes an infrared transmitter and a microcontroller. The infrared transmitter is configured to transmit one or more infrared signals to the one or more consumer devices. The microcontroller is coupled to the infrared transmitter and is configured to control operation of the infrared transmitter. The microcontroller is in communication with an application installed on a mobile device such that the microcontroller is configured to receive one or more instructions from the mobile device. The received one or more instructions are generated from codes stored in a memory of the mobile device. In response to the microcontroller receiving the one or more instructions from the mobile device, the microcontroller is configured to cause the infrared transmitter to transmit the one or more infrared signals to the one or more consumer devices. The dongle is configured to receive power from the mobile device.

A method of controlling consumer devices using an infrared dongle coupled to a mobile device includes receiving power for the infrared dongle from the mobile device. The infrared dongle includes an infrared transmitter coupled to a microcontroller. One or more instructions are received in the microcontroller from the mobile device. The received one or more instructions are generated from codes stored in a memory of the mobile device. In response to the receiving, one or more infrared signals are transmitted via the infrared transmitter to at least one of the consumer devices.

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the present disclosure will be described in connection with certain preferred embodiments and/or implementations, it will be understood that the present disclosure is not limited to those particular embodiments and/or implementations. On the contrary, the present disclosure is intended to cover all alternatives, modifications, and equivalent arrangements and implementations as may be included within the spirit and scope of the present disclosure as defined by the appended claims.

While many of the implementations are described with reference to a mobile device (e.g., a smartphone), the present disclosure is by not limited to implementations using mobile devices. Rather, the present disclosure can be used with a variety of mobile devices, such as, for example, tablets, personal digital assistants (PDA), etc.

As will be explained further below, the infrared dongle of the present disclosure enjoys the advantage over prior dongles of higher performance at a comparable and/or lower cost. By placing most of the intelligence and code libraries in the mobile device used with the dongle of the present disclosure, as opposed to in the dongle itself, a relatively simple and low-cost microcontroller (MCU) can be used in the dongle of the present disclosure. In the case where an audio channel of the mobile device is used for communications between the smartphone and the dongle, a communications protocol can be used to communicate between the dongle and the smartphone to further reduce the complexity of the microcontroller of the dongle of the present disclosure. Thus, relatively better and/or additional circuitry to perform other functions such as carrier frequency generation, modulation, and power harvesting can be included in the dongle of the present disclosure, which improves the performance over that of the prior dongles, at a comparable or lower cost.

Figure 1:
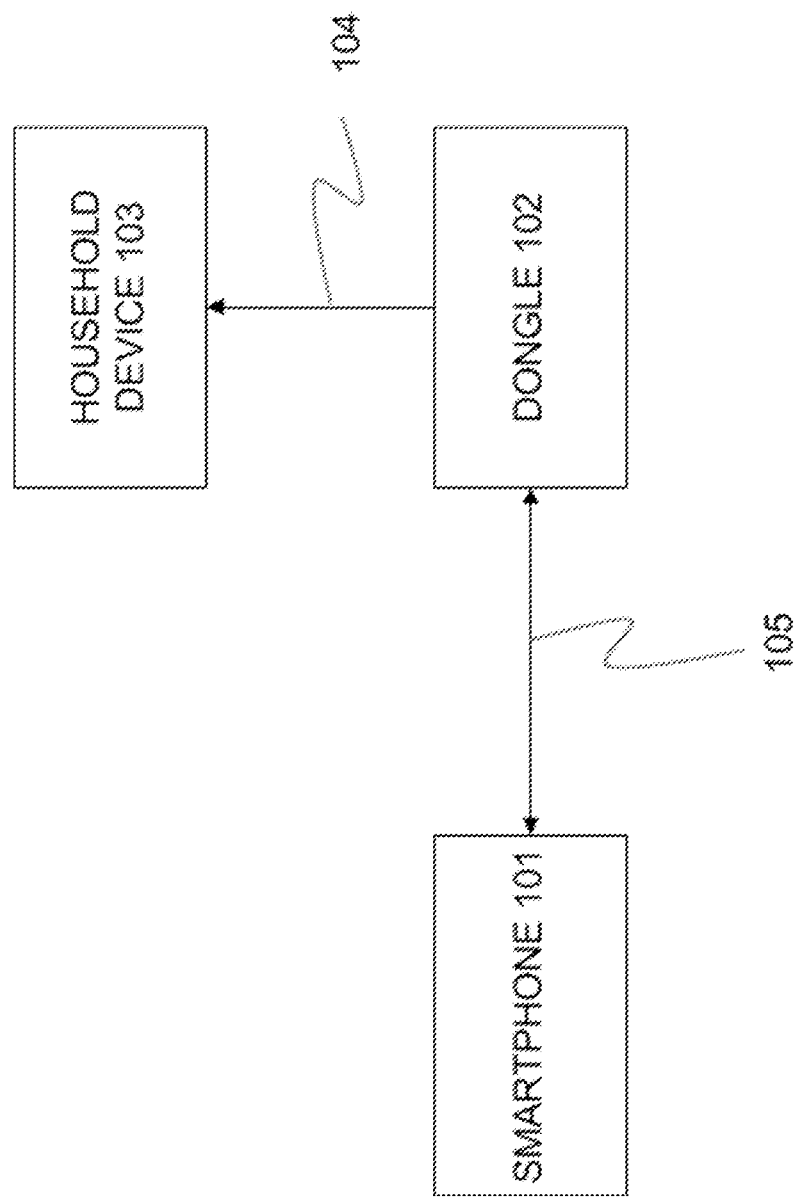
FIG. 1 shows a smartphone with a dongle interacting with a household device, such as a television.

FIG. 1 shows a smartphone 101 with a dongle 102 which is the subject of this specification, interacting with a household device 103, such as a television. The dongle is able to send commands to household device 103 using infrared beam 104. The smartphone 101 and dongle 102 communicate using channel 105.

The dongle provides consumer IR control compatibility to various brands of smartphones and tablets, including Apple iOS-based devices such as Apple iPhone, iPad Mini and Apple iPad;

Android-based devices such as the Samsung Galaxy, Samsung Galaxy Note, and devices made by other manufacturers, such as Huawei, HTC, LG, Motorola, ZTE and Dell;

Blackberry and Blackberry Playbook by Research in Motion (RIM); and

Nokia Lumia, Microsoft Surface.

While the rest of this specification will focus on the Apple iOS and Android-based implementations, these are meant to be exemplary embodiments and do not in any way restrict the applicability of this system.

In an embodiment, the dongle is made of visually dark but infrared transparent plastic. The dongle is preferably kept small so that it can be inserted in a phone or tablet without being damaged.

Figure 2:
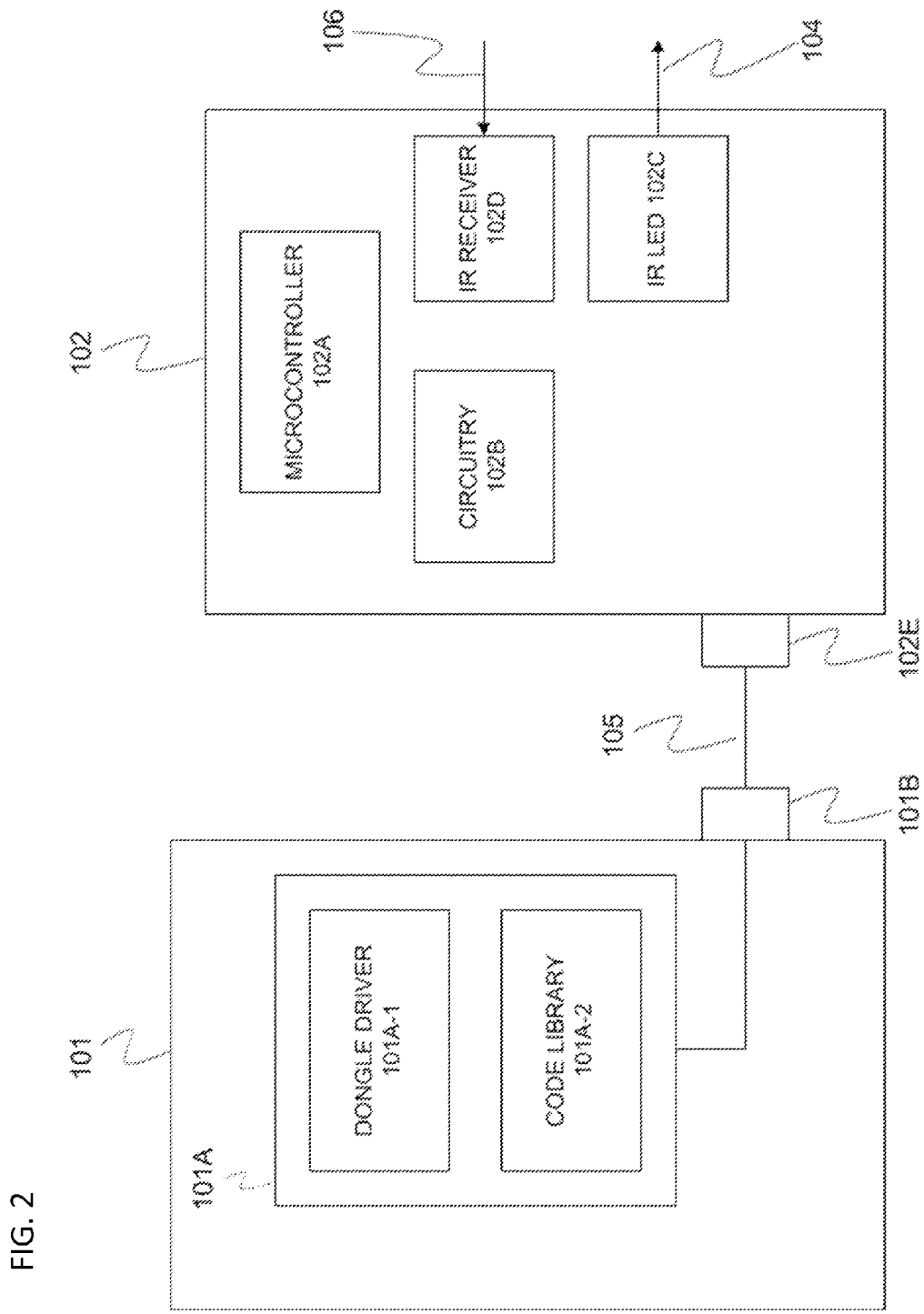
FIG. 2 shows the smartphone interacting with the dongle.

FIG. 2 shows a more detailed diagram of the smartphone 101 interacting with the dongle 102. In particular, the smartphone 101 contains user application 101A. User application 101A emulates a universal remote. The user application 101A transmits commands to the dongle via dongle driver 101A-1, so that the dongle sends the appropriate IR command. Most of the intelligence resides in the user application 101A.

In one embodiment, commands are sent to the dongle in uncompressed format so as to reduce microcontroller (MCU) processing requirements. For each key pressed, a protocol packet describing the key carrier frequency and its code duration is sent followed by a series of pulse width modulated (PWM) signals corresponding to the duration of the key presses. In another embodiment, commands are sent to the dongle in a suitable compressed IR format such as Pronto Hex. The MCU then decompresses the compressed data before generating a modulated signal for transmission.

User application 101A also comprises a code library 101A-2, where IR codes are stored and retrieved to be sent to the dongle 102. By having the code library 101A-2 reside in user application 101A, improved flexibility is achieved while keeping costs low. In one embodiment, IR codes are downloaded to the smartphone 101 from a website such as the Linux Infrared Remote Control website (see, for example, http://www.lirc.org) and stored in the code library 101A-2. In another embodiment, the codes are licensed from an IR code library vendor and then downloaded by smartphones through a cloud server. In another embodiment, the dongle 102 "learns" IR codes from remote controllers for consumer devices, and the learnt codes are stored in code library 101A-2. Methods to achieve this will be described more in detail below.

There are two connectors, smartphone connection point 101B and dongle connection point 102E which connect the smartphone 101 to the dongle 102 using connection 105. Different types of connection schemes can be used.

In one embodiment, dongle connection point 102E is a telephone headset style connector, and smartphone connection point 101B is the smartphone headset port or jack. Then connection 105 is an audio channel wherein the dongle and smartphone communicate using serial data modulated or not on an audio carrier. Data and commands to the mobile device are sent on the microphone input, and data and commands from the user application are sent to the dongle over one or both stereo channels.

In a further embodiment, the smartphone user application 101A and the dongle microcontroller 102A communicate over the audio channel using a special communications protocol, which will be described in detail below. In this embodiment, the dongle 102 derives its power from the headset jack.

In another embodiment, the dongle connection point 102E is a multiple pin dock connector, such as, for example, an Apple 30-pin dock connector for Apple iOS-based devices. Then smartphone connection point 101B is an Apple 30-pin port. In this embodiment, the dongle and smartphone communicate over channel 105 using serial data.

In yet another embodiment, connection 105 is a Universal Serial Bus (USB) connection. As would be known to one having skill in the art, many smartphones have USB "On the Go" (OTG) capability. USB OTG enables the smartphone to be configured to be the master or host of this connection. In this embodiment, smartphone connection point 101B and dongle connection point 102E are, for example, micro USB ports. Using USB enables the smartphone to supply power to the dongle over the USB connection.

In one embodiment, the dongle 102 contains a microcontroller 102A. The microcontroller 102A for the dongle 102 consumes a small amount of power to minimize the effect on the battery life of the attached smartphone 101. In one embodiment, the application 101A can transmit a sleep request packet to the microcontroller so that the microcontroller enters sleep mode. Further details will be explained below.

The dongle is able to both send and record commands for consumer devices using IR signals. There is an IR light emitting diode (LED) 102C for transmitting signals, and a receiver 102D for receiving signals.

Circuitry 102B is comprised of different types of circuits for the operation of the dongle. In one embodiment, circuitry 102B includes a modulation unit or module which is capable of generating electronic carriers which are centre frequencies for a set of channels, each channel having a bandwidth. The modulation unit is also capable of modulating data onto the generated carriers. In one embodiment, the microcontroller selects a frequency for the carrier. In the above described embodiment where codes are sent in a compressed format such as Pronto Hex, the codes are decompressed by the MCU, and after decompression the MCU generates a series of PWM signals which are then electronically modulated onto the carrier. If the code is sent as a series of PWM signals by the application, then the MCU does not need to perform a decompression step. The MCU can instruct the modulation unit to use these signals to electronically modulate the carrier. The modulated electronic signal, is then used to directly modulate the infrared LED 102C to transmit information over an outgoing IR beam 104 to a consumer device such as household device 103 of FIG. 1.

Additionally, if the smartphone 101 and dongle 102 communicate using audio channels via the headset port, a challenge is posed: IR transmission requires high amounts of power relative to the amount that can be supplied by a relatively lower power audio channel. This challenge can be solved using power harvesting. Referring to FIG. 2, a power harvester is part of circuitry 102B.

In one implementation, the power harvester consists of an impedance matched micro transformer tuned to high audio frequencies combined with a bridge rectifier using, for example, Schottky diodes, to minimize voltage drop; and a voltage regulator and a large capacitor for energy storage to extract energy. Many prior devices use a charge pump based circuit for the power harvester. While the impedance matched tuned micro-transformer circuit occupies a larger footprint compared to the charge pump-based circuit approach used in the prior devices, the former approach provides a higher peak current. For example, when using an iPhone® 4S with the dongle of the present disclosure, the impedance matched tuned micro-transformer circuit can extract a peak power of about 40 mW per audio channel, which equates to a peak current of 20 mA assuming a voltage drop of 2V, which is compared to a peak power of 14 mW, which equates to a peak current of 7 mA also assuming a voltage drop of 2V for the charge pump based harvester used in the prior devices.

In yet another embodiment, a miniature rechargeable battery can be used in place of the large capacitor in the power harvester to store energy. This battery can be trickle charged by the power harvester circuit. This embodiment provides much higher peak current to the LED than both the previous embodiments.

By using the power harvester in the case where communications occurs over the audio channel, this enables better performance in terms of range and signal to noise ratio (SNR) for IR transmission, compared to products which similarly use the audio channel to communicate IR codes.

In yet another embodiment, a mini battery can be used as part of circuitry 102B to provide the power necessary for IR transmission.

In yet another embodiment, circuitry 102B can be part of the microcontroller 102A.

As explained before, in one embodiment, the dongle 102 is connected to the smartphone 101 where connection 105 uses the Universal Serial Bus (USB) protocols. In this embodiment, the need for a power harvesting circuit or a battery in the dongle is eliminated, as USB can supply sufficient power to meet the needs of the dongle.

The dongle microcontroller 102A is capable of interpreting commands sent by the application 101A. These commands include but are not limited to commands for activation
sleep
sending IR codes to consumer devices
learning IR codes from remote controller for consumer device as will be explained further below The dongle microcontroller 102A can send commands to the application 101A. These commands include but are not limited to commands for Ready to receive more commands
Storing IR codes in library, and
Error messages As previously explained, under the control of the application, the dongle 102 is capable of learning new IR codes from an unknown remote controller in response to a LearnIR command. In one embodiment of the IR code learning, the dongle 102 is placed close to the remote controller from which codes are to be learnt. The user presses the buttons on the remote controller from which the codes are to be learnt. The dongle microcontroller 102A receives the transmitted signals using IR receiver 102D and transmits the information over connection 105 to the smartphone application 101A. There, the codes are extracted using techniques well known to those of skill in the art and stored in the code library 101A-2 using a command to store IR codes. The IR receiver 102D can detect carrier frequencies up to 60 kHz and support IR code learning for devices which transmit using such carrier frequencies.

By placing the code library 101A-2 and having most of the intelligence reside in application 101A installed in smartphone 101, a less complex microcontroller (e.g., less expensive, less memory, physically smaller, etc.) can be used in the dongle of the present disclosure. Furthermore, placing the code library 101A-2 in the smartphone has the advantage of minimizing the processing and memory requirements for the microcontroller. In some implementations, the microcontroller is an 8-bit microcontroller with about 3.5 kilobytes of One Time Programmable Read Only Memory (OTPROM) and about 145 bytes of Random Access Memory (RAM). In other implementations, the microcontroller is an 8-bit microcontroller with about 1.75 kilobytes to about 7 kilobytes of OTPROM and having a RAM of between about 128 bytes and about 512 bytes. Yet in other implementations, the microcontroller is an 8-bit microcontroller with about 3.5 kilobytes to about 7 kilobytes of OTPROM and having a RAM of between about 145 bytes and about 256 bytes.

Also, in the case where the connection 105 is an audio channel, a relatively simple communications protocol can be used for communications between the smartphone and the dongle. Furthermore, by having the codes reside in a memory of the smartphone, flash memory is no longer required to be included in the dongle. Also, as previously stated, according to some implementations of the present disclosure, uncompressed-format commands (e.g., instructions) are sent to the dongle from the smart phone according to the communications protocol described below. By sending uncompressed-format commands (e.g., codes and/or signals, instructions, etc.) to the dongle, the microcontroller processing requirements can be reduced. For example, relatively less memory and/or processing power is needed on the microcontroller as compared to a microcontroller in a dongle that is configured to receive compressed-format commands.

This compares favourably to the microcontrollers used in the prior devices. For example, some microcontrollers used in the prior devices included 1 kilobyte of RAM, 8 kilobytes of NOR Flash memory and 512 bytes of Electrically Erasable Programmable Read-Only Memory (EEPROM). Comparing such a prior device to the dongle of the present disclosure, the RAM size of the prior device can be at least twice the size of the RAM size of the dongle of the present disclosure. That is, the implementation with up to 512 bytes of RAM. Further, none of the microcontrollers of the dongle of the present disclosure described above utilize flash memory, as explained previously. While, in some implementations, the prior devices might use less ROM compared to the microcontrollers of the dongle of the present disclosure, the OTPROM used in the microcontrollers of the dongle of the present disclosure is relatively less expensive than the EEPROM used in the prior devices.

Many prior systems use frequency shift keying (FSK) to transmit information from the smartphone to the dongle. However, this requires the use of more complex tone detectors in the dongle. In order to further simplify the design of a dongle, according to some implementations of the present disclosure, the dongle uses non-return-to-zero (NRZ) encoding. Using NRZ encoding removes the need for a complex tone detector, as the dongle requires a relatively simpler edge detector at the receiving end. However, in some implementations, the audio channel bandwidth is limited to 20 kHz, meaning that if NRZ data is transmitted over the channel, the signal may experience distortion. In some such implementations, the data being transmitted over the audio channel is pre-filtered using a low pass filter in the smartphone. The NRZ data can be pre-filtered in smartphone 101 prior to entering smartphone connection point 101B as shown in FIG. 2.

Furthermore, the NRZ data used is bipolar NRZ data rather than unipolar NRZ data. This is because the voltage range used in the audio channel can be in the [−0.5V, 0.5V] range, which is relatively limited. Using bipolar rather than unipolar NRZ helps improve immunity to noise and consequently the signal-to-noise ratio (SNR) for information transmitted over the audio channel, thus improving the integrity of the data transmitted over the audio channel.

The features explained above, that is, the use of uncompressed formats for transmitting instructions to a dongle from a mobile device; using NRZ encoding; pre-filtering singles and/or instructions sent to a dongle from a mobile device; and storing codes in a memory of a mobile device associated with an application configured to execute on the mobile device; reduce the need for a relatively complex microcontroller as described herein. Consequently microcontrollers with comparably less processing power, but with better capabilities to perform functions specific to the purpose intended for the dongle of the present disclosure can be used. Further, in some implementations, the microcontroller of the dongle of the present disclosure is able to generate a carrier frequency of up to 455 kHz, which enables the dongle to communicate with a relatively broader range of consumer devices (e.g., more televisions, more DVD players, more gaming systems, more receivers, etc.).

As explained previously, in one embodiment the smartphone user application and the dongle communicate over the audio channel using a communications protocol. This communications protocol is described further below. In one embodiment, as part of the communications protocol two or more types of data are multiplexed together and sent on the at least one audio channel. In another embodiment, the two or more types of data are sent at different bit rates. In yet another embodiment, the two or more types of data are sent using different encoding schemes. An example of this is given below. In one embodiment, the two types of data are:
  Packetized control data transmitted using a bit rate of 4.424 kbps. In a further implementation, as explained previously this data is coded using bipolar NRZ, for the reasons previously stated.
  Envelope data composed of IR codes to be transmitted to the consumer device. As explained previously, in one embodiment this envelope data is in a compressed format such as Pronto Hex. In another embodiment, as also previously explained, this envelope data is uncompressed and sent as PWM signals.

In one embodiment, the two or more types of data are sent in a pre-determined frequency band which is set wide enough to accommodate the two or more types of data.

The following embodiments are described with the reference to the above example, that is, the two types of data are used in the audio channel, one being the packetized control data and the other being the envelope data described above.

Figure 3:
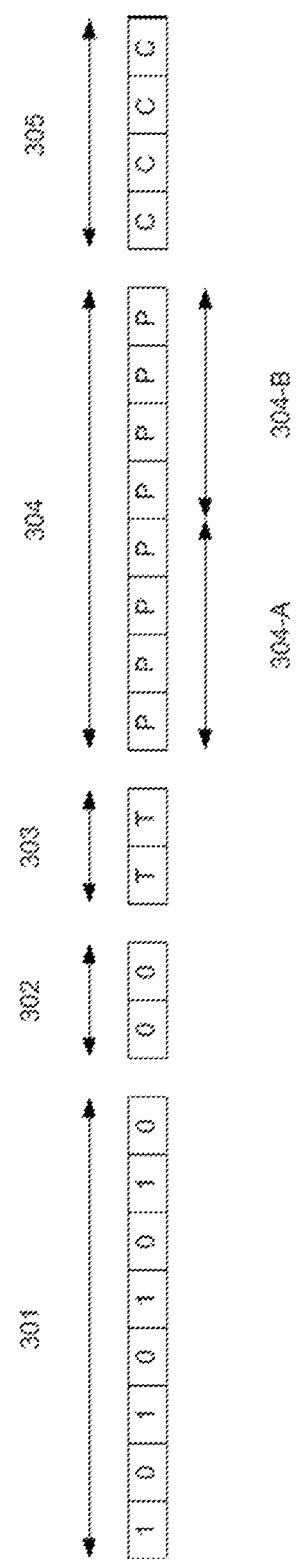
FIG. 3 shows an example protocol packet.

FIG. 3 shows an example control packet according to the protocol. Field 301 is a start sequence made of alternating '1's and '0's. In one embodiment it is 8 bits long. This sequence is used as it would not occur as a natural part of operation.

Figure 3A:
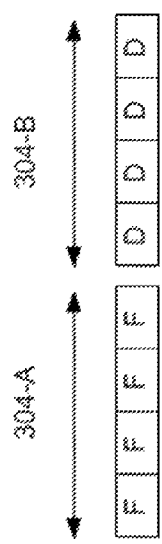
FIG. 3A shows sub-fields 304-A and 304-B in the case of an envelope packet.
Figure 3B:
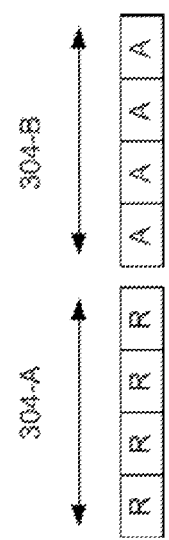
FIG. 3B shows sub-fields 304-A and 304-B in the case of a request packet.
Figure 3C:
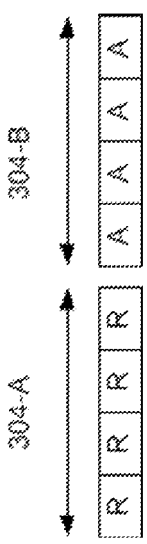
FIG. 3C shows sub-fields 304-A and 304-B in the case of a response packet.
Figure 4:
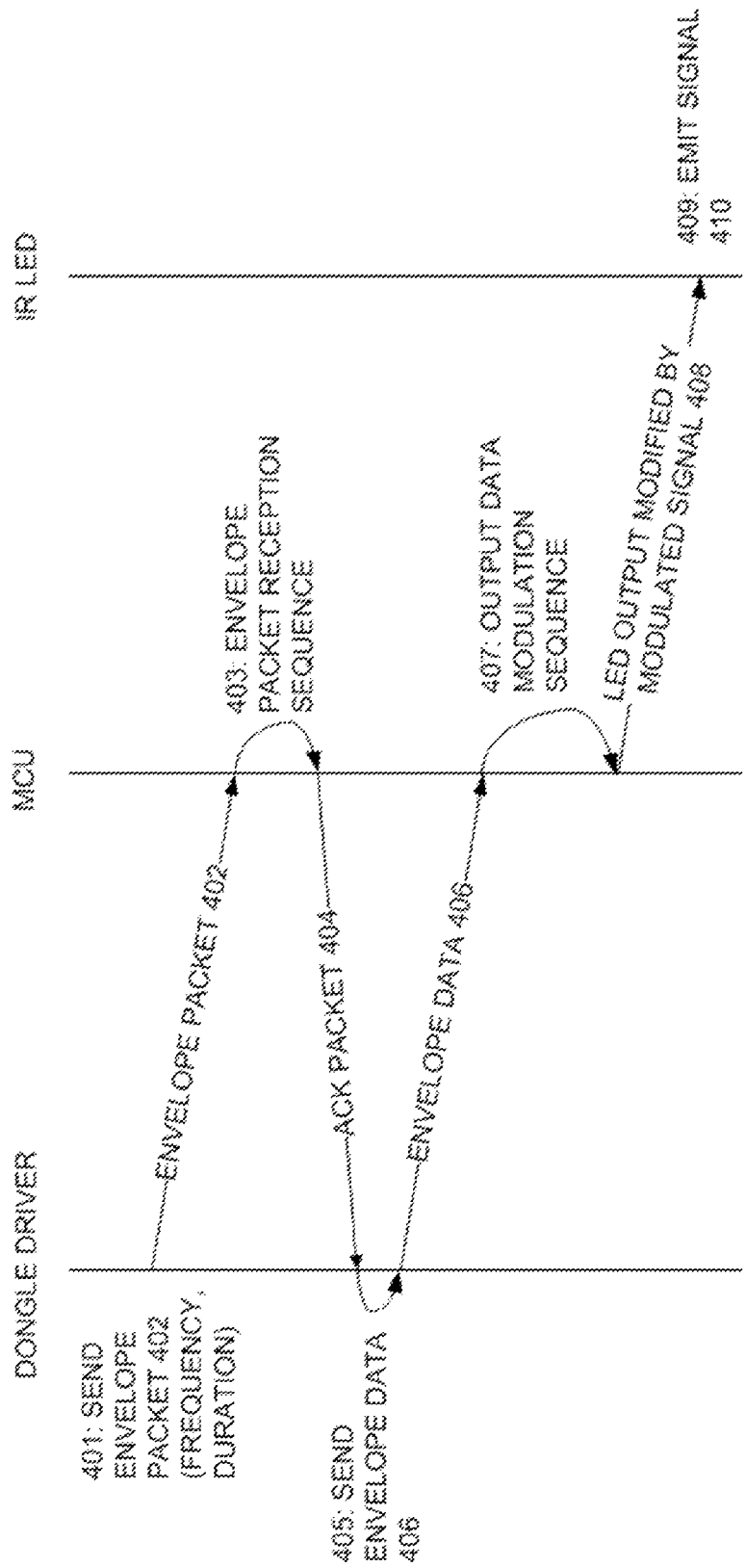
FIG. 4 shows a diagram describing one embodiment of the envelope modulation process.

Field 302 is the protocol version. Field 303 is the packet type. In one embodiment there are 3 possibilities, each having different binary representation:
  00: Envelope Packet Type
  01: Request Packet Type
  10: Response Packet Type Field 304 is the packet payload. In one embodiment, there are two sub-fields 304-A and 304-B. The composition of the sub-fields depends on the type of payload. In one embodiment, there are 3 types of payloads:
  Envelope packet
  Request packet
  Response packet In this embodiment, if the payload is an envelope packet type, then as shown in FIG. 3A, sub-field 304-A is the carrier frequency sub-field, and sub-field 304-B is the envelope duration sub-field. The carrier frequency sub-field 304-A contains a carrier frequency index which the MCU can use to reference a lookup table so as to generate the desired carrier frequency. For example, if in the lookup table frequency index 0001 corresponds to 24 kHz, then to generate a 24 kHz carrier, 0001 must be entered into the carrier frequency sub-field. Subfield 304-B gives the duration of the envelope in pre-determined intervals, for example, 0.1 s If the payload is a request packet type, then sub-field 304A contains a binary representation corresponding to the request type, as shown in FIG. 3B. Examples of request types and corresponding binary representation include:
  0000: GetDongleInfo request. Returns dongle information
  0001: TurnOnLED request. Turns on LED
  0010: TurnOffLED request. Turns off LED
  0011: Sleep Request. Put MCU into Sleep Mode. The MCU is awakened using a special wakeup sequence
Sub-field 304B contains the request arguments If the payload is a response packet type, then sub-field 304A contains a binary representation corresponding to the response type, as shown in FIG. 3C. Examples of response types and corresponding binary representations include:
  0000: ACK: Positive Acknowledgement
  0001: NACK: Negative Acknowledgement
  0010: GetDongleInfo response packet
Sub-field 304B contains the response arguments. Examples of response arguments include:
  0000: ACK and NACK packets
  For GetDongleInfo packets: indicates the number of additional dongle info bytes following the GetDongleInfo response packet Field 305 is the parity checksum field, which is used for error checking FIG. 4 shows a diagram describing one embodiment of the envelope modulation process. In step 401, the dongle driver on the smartphone application sends an envelope packet 402 in the format described in FIG. 3 and FIG. 3A. On receiving envelope packet 402, the MCU performs the sequence 403 as shown in FIG. 4A.

Figure 4A:
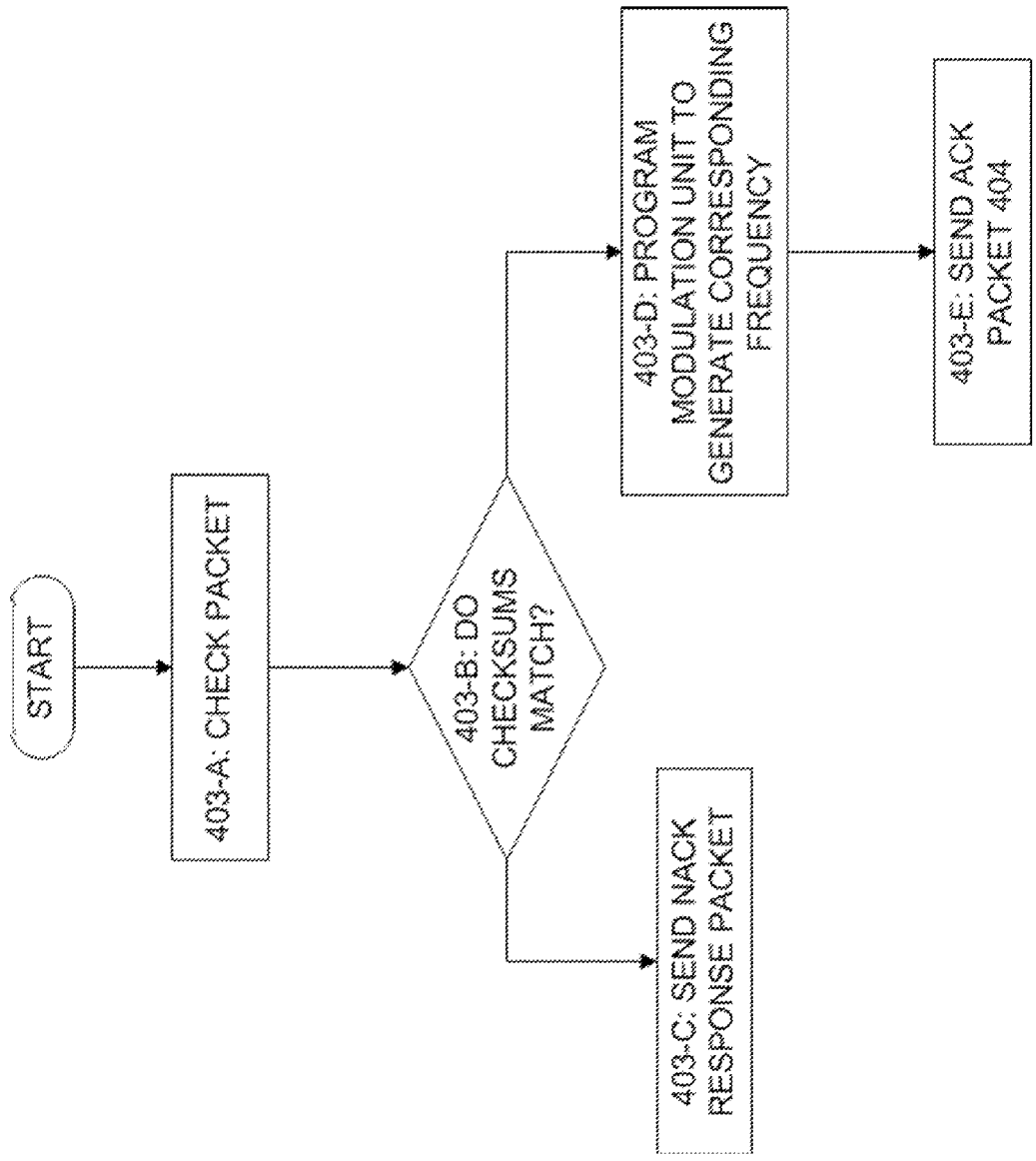
FIG. 4A shows a flowchart of sequence 403.

In FIG. 4A, in step 403-A the MCU checks the packet by performing a checksum operation and comparing the result to that contained within field 305. (step 403-B) If the two checksums do not match, then the MCU progresses to step 403-C, in which it sends a Negative Acknowledgement (NACK) packet. If it matches, then in step 403-D the MCU programs the modulation unit to generate the frequency corresponding to the binary representation stored within the carrier frequency sub-field of envelope packet 402, for a duration corresponding to the binary representation stored within the duration sub-field of envelope packet 402. In step 403-E, the MCU sends an Acknowledgement (ACK) packet 404 to the dongle driver.

Figure 4B:
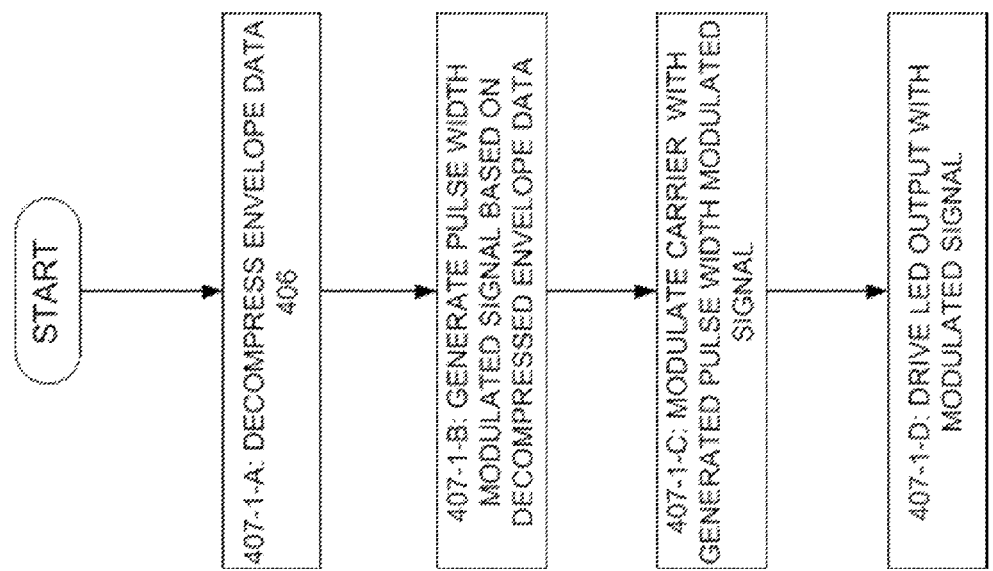
FIGS. 4B and 4C shows flowcharts for two different embodiments of sequence 407.

In step 405, the dongle driver then sends envelope data 406 to the MCU. Upon receiving this data, the MCU performs output data modulation sequence 407. In one embodiment, corresponding to the situation where envelope data is sent to the MCU in a compressed format, the steps involved in output data modulation sequence 407 are shown in FIG. 4B. In step 407-1-A, the MCU decompresses the envelope data. In step 407-1-B, a pulse width modulated signal is generated by the MCU based on the decompressed data. In step 407-1-C the MCU then programs the modulation unit to modulate the previously generated carrier with the pulse width modulated signal. In step 407-1-D, the MCU drives the LED output with the modulated signal generated in step 407-1-C. The modified LED output containing the modulated signal 408 is then sent to the LED, which then emits optical signal 410.

Figure 4C:
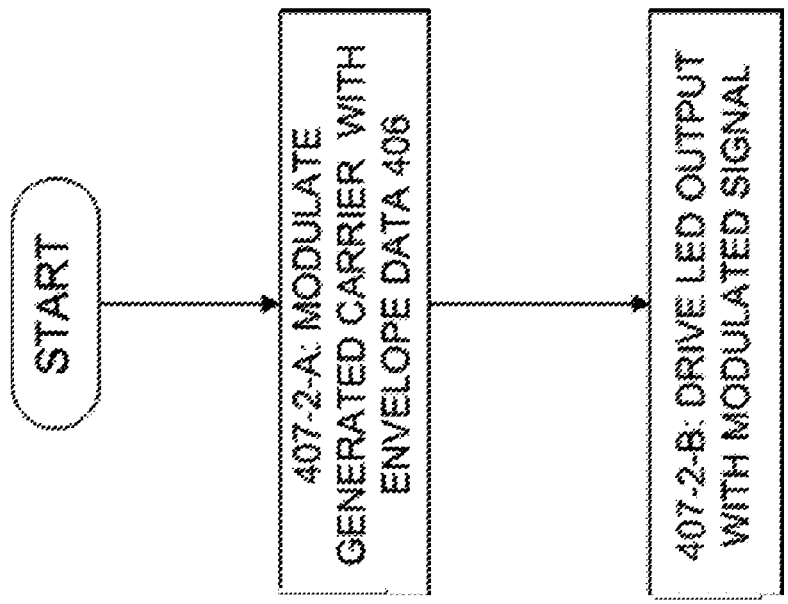

In another embodiment, corresponding to the situation where envelope data 406 is sent as a series of PWM signals, as shown in FIG. 4C the MCU programs the modulation unit to modulate the previously generated carrier with the envelope data 406 in step 407-2-A. In step 407-2-B, the MCU drives the LED output with the modulated signal generated in step 407-2-A.

Figure 5:
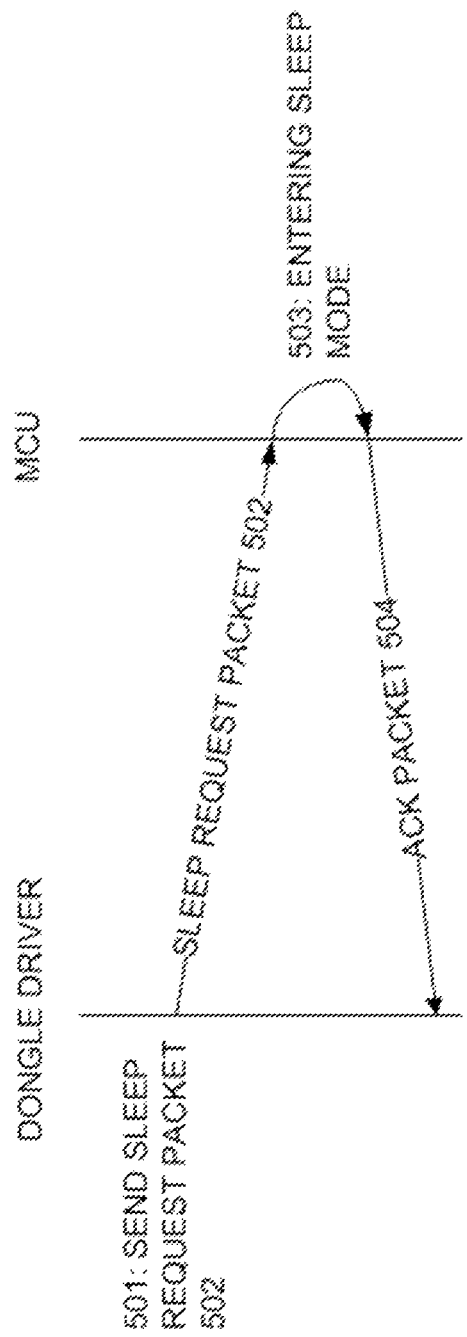
FIG. 5 shows a flowchart for the dongle entering sleep mode.
Figure 5A:
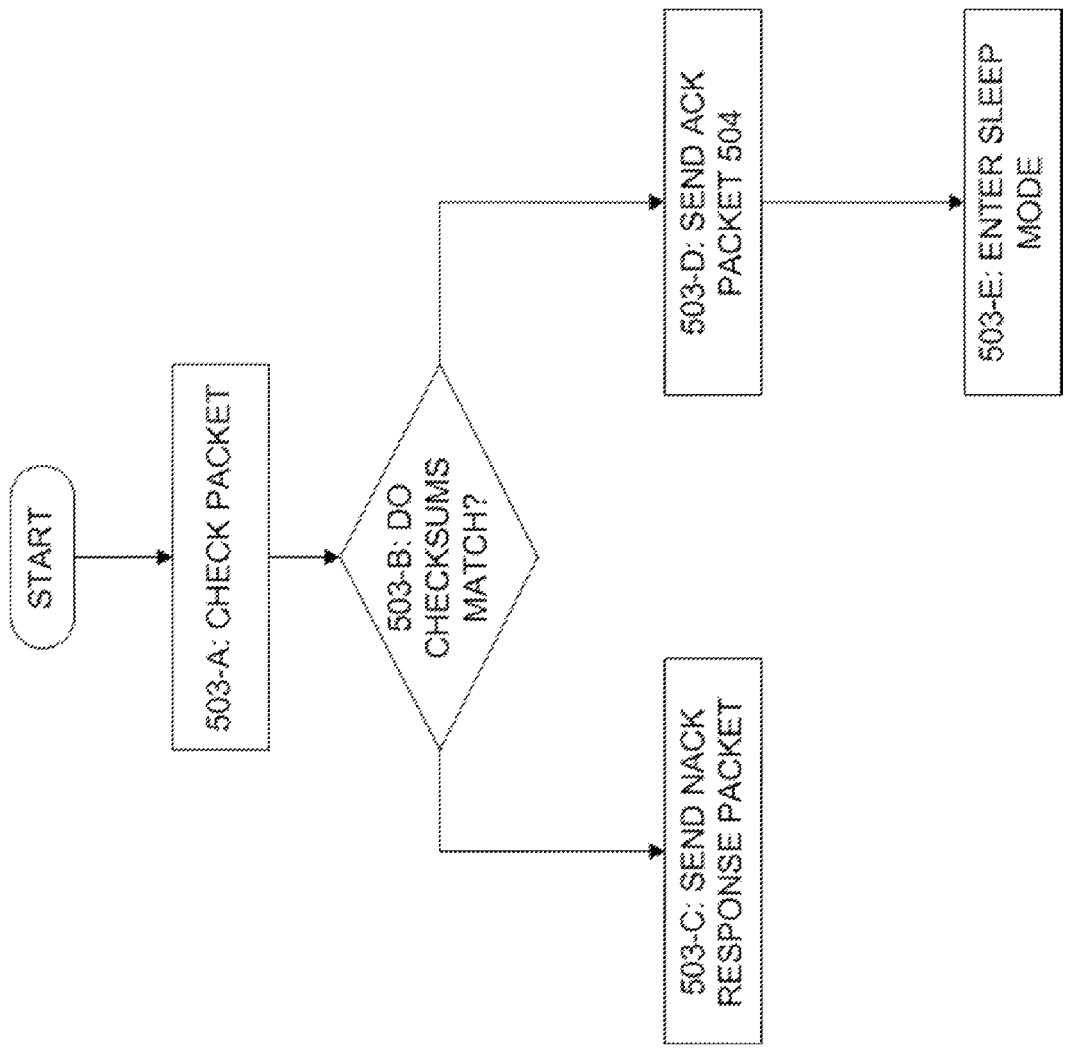
FIG. 5A shows a flowchart for sequence 503.

As previously explained, in one embodiment the application asks the microcontroller to enter sleep mode. FIG. 5 shows the sequence to enter sleep mode. In step 501, the dongle driver sends a sleep request packet 502 which follows the format shown in FIG. 3 and FIG. 3B, to the MCU to enter sleep mode. The MCU then performs sequence 503. In FIG. 5A, in step 503-A the MCU checks the packet by performing a checksum operation and comparing the result to that contained within field 305. (step 503-B) If the two checksums do not match, then the MCU progresses to step 503-C, in which it sends a Negative Acknowledgement (NACK) packet. If it matches, then in step 503-D it sends an Acknowledgement (ACK) packet 504 to the dongle driver. In step 503-E it enters sleep mode.

Figure 6:
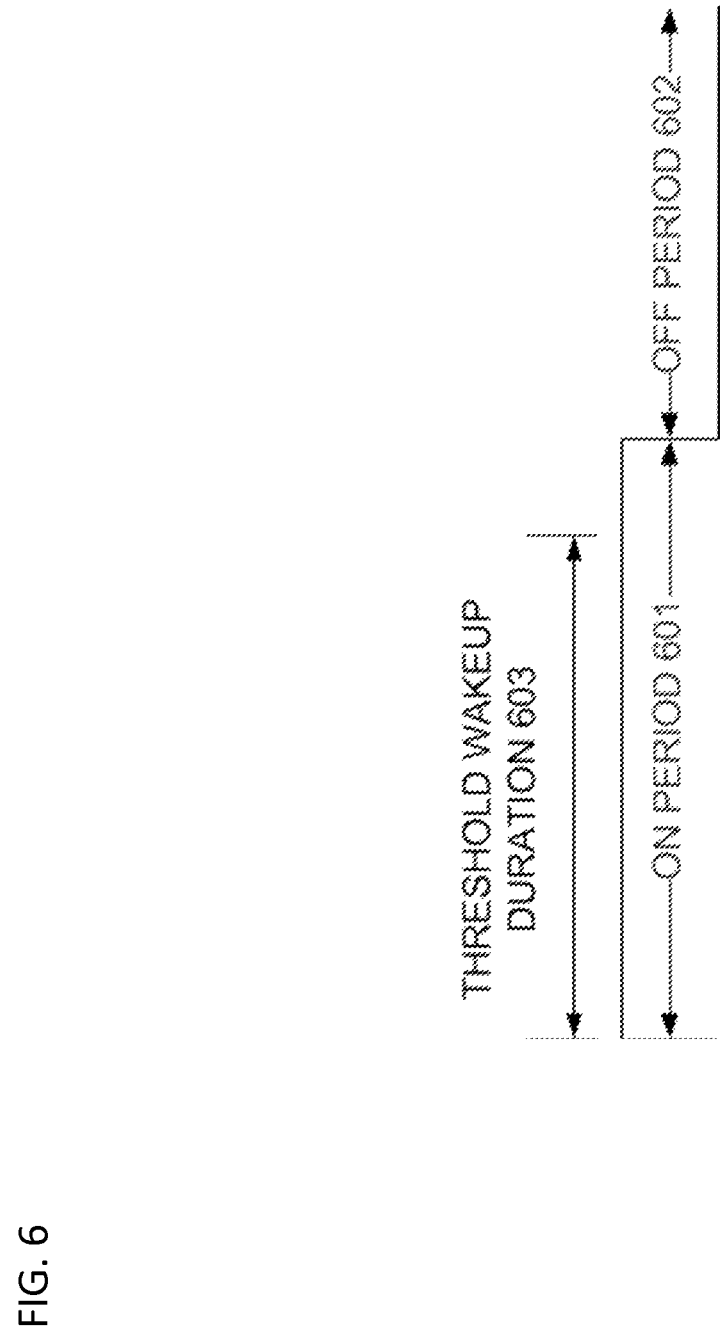
FIG. 6 shows a wakeup sequence.

The application can wake up the microcontroller using a wakeup sequence. In one implementation, the MCU wakes up on an input interrupt, if its input signal line is kept high for longer than a threshold wakeup duration. In order to achieve this, in one embodiment, as shown in FIG. 6, the application sends a wakeup sequence comprising a signal with ON period 601 longer than the threshold wakeup duration 603, followed by OFF period 602.

As explained before, the user application 101A and dongle microcontroller 102A can communicate using USB. If a USB connection is used, then the user application 101A would have to embed the codes necessary for IR transmission into USB packets, and send these codes. Techniques to achieve this are well known to one having skill in the art.

In another embodiment, there is a companion dongle which can be attached to a suitable port of the consumer device. Then the companion dongle draws power from the consumer device and interacts with the consumer device. This has further advantages. For example, information transmission IR codes and formats which enable energy efficient use of the IR dongle but which may not be standard can be used by the IR dongle on the smartphone to communicate with the companion dongle on the consumer device. Then, the companion dongle can translate these non-standard codes for the consumer device to understand.

While particular embodiments and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the present disclosure as defined in the appended claims.

The invention claimed is:

1. An infrared dongle for communicating with one or more consumer devices, the infrared dongle comprising:
an infrared transmitter to transmit one or more infrared signals to the one or more consumer devices;
a microcontroller coupled to the infrared transmitter to control operation of the infrared transmitter, the microcontroller being in communication with an application installed on a mobile device such that the microcontroller receives one or more instructions from the mobile device, the received one or more instructions being generated from codes stored in a memory of the mobile device, the received one or more instructions including non-return-to-zero (NRZ) coded data, wherein the NRZ coded data is bipolar coded data, and wherein receiving the NRZ coded includes using an edge detector, the microcontroller further including a one time programmable read only memory;
wherein in response to the microcontroller receiving the one or more instructions from the mobile device, the microcontroller causes the infrared transmitter to transmit the one or more infrared signals to the one or more consumer devices, and wherein the dongle receives power from the mobile device;
further wherein the infrared dongle is directly coupled to the mobile device using one or more audio channels of the mobile device such that the microcontroller communicates with the application over the one or more audio channels of the mobile device; and
further wherein at least a portion of the one or more instructions received by the microcontroller from the mobile device are sent in an uncompressed format.

2. The infrared dongle of claim 1, wherein the mobile device is a smartphone or a tablet computer.

3. The infrared dongle of claim 2, wherein the application learns codes using the infrared dongle and stores at least a portion of the learnt codes in the memory of the mobile device.

4. The infrared dongle of claim 1, wherein the one or more instructions received by the microcontroller from the mobile device include data that is pre-filtered using the mobile device.

5. The infrared dongle of claim 1, further comprising a power harvester circuit coupled to the microcontroller to receive and adapt power from the mobile device over the one or more audio channels.

6. The infrared dongle of claim 5, wherein the power harvester circuit is a tuned circuit including an impedance matched microtransformer, and a capacitor or a rechargeable battery.

7. The infrared dongle of claim 1, wherein the received one or more instructions include packetized control data and envelope data, and wherein the packetized control data and the envelope data are multiplexed together before being received by the microcontroller over the one or more audio channels of the mobile device.

8. A method of controlling one or more consumer devices using an infrared dongle coupled to a mobile device using one or more audio channels of the mobile device, the method comprising:
receiving power for the infrared dongle from the mobile device over the one or more audio channels of the mobile device, the infrared dongle including an infrared transmitter coupled to a microcontroller, the microcontroller including a one time programmable read only memory;
receiving, in the microcontroller, one or more instructions from the mobile device over the one or more audio channels of the mobile device, at least a portion of the one or more instructions being received in an uncompressed format, the received one or more instructions being generated from codes stored in a memory of the mobile device, further wherein the receiving one or more instructions includes receiving non-return-to-zero (NRZ) coded data, wherein the NRZ coded data is bipolar coded data, and wherein the receiving the NRZ coded data includes detecting the NRZ coded data using an edge detector; and
in response to the receiving, transmitting, via the infrared transmitter, one or more infrared signals to at least one of the one or more consumer devices.

9. The method of claim 8, wherein the codes are included in a library of codes stored in the memory of the mobile device.

10. The method of claim 9, further comprising:
   learning codes from one of the consumer devices, the learning performed by an application executing on the mobile device using the infrared dongle; and
   storing the learnt codes in the library of codes.

11. The method of claim 8, further comprising pre-filtering data associated with the codes stored in the memory prior to the receiving the one or more instructions.

12. The method of claim 11, wherein the pre-filtering is performed on the mobile device.

13. The method of claim 8, further comprising adapting the received power using a power harvester circuit that is coupled to the microcontroller.

14. The method of claim 13, wherein the power harvester circuit is an impedance matched tuned circuit with a microtransformer, the tuned circuit further including a capacitor or a rechargeable battery.

15. The method of claim 8, wherein the mobile device is a smartphone or a tablet computer.

16. The method of claim 8, wherein the receiving the one or more instructions includes receiving, in the microcontroller, packetized control data and envelope data, the method further comprising, prior to the receiving the one or more instructions, multiplexing the packetized control data and the envelope data together.

\* \* \* \* \*